United States Patent
Bjornstad

(10) Patent No.: US 8,073,328 B2
(45) Date of Patent: Dec. 6, 2011

(54) USE OF POLARIZATION FOR DIFFERENTIATION OF INFORMATION

(75) Inventor: Steinar Bjornstad, Bekkestua (NO)

(73) Assignee: Transpacket AS, Oslo (NO)

( * ) Notice: Subject to any disclaimer, the term of this patent is extended or adjusted under 35 U.S.C. 154(b) by 862 days.

(21) Appl. No.: 10/563,494

(22) PCT Filed: Jun. 28, 2004

(86) PCT No.: PCT/NO2004/000195
§ 371 (c)(1),
(2), (4) Date: Jan. 4, 2006

(87) PCT Pub. No.: WO2005/004363
PCT Pub. Date: Jan. 13, 2005

(65) Prior Publication Data
US 2006/0159454 A1    Jul. 20, 2006

(30) Foreign Application Priority Data

Jul. 4, 2003    (NO) .................................. 20033075

(51) Int. Cl.
*H04J 14/06*    (2006.01)
*H04B 10/04*    (2006.01)
*H04B 10/12*    (2006.01)

(52) U.S. Cl. ........................... 398/65; 398/152; 398/184

(58) Field of Classification Search ..................... 398/65, 398/152, 183, 184, 295
See application file for complete search history.

(56) References Cited

U.S. PATENT DOCUMENTS

| | | | | |
|---|---|---|---|---|
| 5,900,957 A * | 5/1999 | Van Der Tol | ................... | 398/54 |
| 6,580,535 B1 * | 6/2003 | Schonfelder | ................... | 398/65 |
| 6,819,872 B2 * | 11/2004 | Farries et al. | ................. | 398/102 |
| 7,058,974 B1 * | 6/2006 | Maher et al. | ................... | 726/13 |
| 2002/0018264 A1 * | 2/2002 | Kodialam et al. | ............. | 359/128 |
| 2002/0141446 A1 * | 10/2002 | Koga | ............................. | 370/468 |
| 2003/0026250 A1 * | 2/2003 | Fang | ............................. | 370/386 |
| 2003/0048506 A1 * | 3/2003 | Handelman | .................... | 359/128 |
| 2003/0090760 A1 * | 5/2003 | Glingener | ...................... | 359/122 |
| 2003/0138253 A1 * | 7/2003 | Kim et al. | ......................... | 398/69 |
| 2004/0218933 A1 * | 11/2004 | Fludger et al. | ................ | 398/205 |
| 2008/0019692 A1 * | 1/2008 | Fischler et al. | ................. | 398/50 |

OTHER PUBLICATIONS

Mike J. O'Mahony et al., "The Application of Optical Packet Switching in Future Communication Networks", IEEE Communication Magazine, Mar. 2001, pp. 128-135.

Chunming Ciao et al., "Labelled Optical Burst Switching for IP-over-WDM Integration" IEEE Communication Magazine, Sep. 2000, pp. 104-114.

(Continued)

*Primary Examiner* — Nathan Curs
(74) *Attorney, Agent, or Firm* — Schneck & Schneck; Thomas Schneck

(57) ABSTRACT

The present invention discloses a system for signalling within optical or combined optical/electronic networks wherein a first transmission node executes polarization multiplexing on transmitted traffic, and at one or more intermediate nodes one or more of the following processes are carried out on the sent traffic: demultiplexing by polarization and/or polarization and/or SOP-alignment. Further a method for packet handling within optical packet switched networks where, at a first transmission node carries out polarization demultiplexing of transmitted traffic, and at one or a number of intermediate nodes carries out one or more of the following processes on the transmitted traffic; demultiplexing by polarization, and/or polarization and/or SOP-alignment. Said separation into states of polarization is used in separation of QoS-classes.

11 Claims, 11 Drawing Sheets

OTHER PUBLICATIONS

N. Ghani et al., "On IP over WDM Integration", IEEE Communication Magazine, Mar. 2000, pp. 72-83.

Betti, S.; Curti, F.; De Marchis, G.; Iannone, E Fon-dazione Ugo Bordoni, Rome, Italy, "A Novel Multilevel Coherent Optical System: 4-Quadrature Signaling" Journal of Lightwave Technology, pp. 514-523, Apr. 1991, vol. 9, Issue 4.

Guillemot et al., "Transparent Optical Packet Switching: the European ACTS KEOPS Project Approach", Journal Lightwave Tech., vol. 16, pp. 2117-2134, 1998.

D.J. Blumenthal et al., Dept. of Electr. & Comput. Eng., Calif. Univ., Santa Barbara, CA, USA, "WDM Optical IP Tag Switching with Packet-Rate Wavelength Conversion and Subcarrier Multiplexed Addressing", Optical Fiber Commun. Conf., 1999, and the Int'l Conf. on Integrated Optics and Optical Fiber Commun., OFC/IOOC '99, Technical Digest, pp. 162-164, vol. 3, 21-26, Feb. 1999.

Xu Lei et al., "All Optical Frame Clock Extraction with Polarization Flag in OTDM System", Communications 1999, APCC/OECC '99, Fifth Asia-Pacific Conf. on . . . and Fourth Optoelectronics & Communications Conf., 1999, pp. 361-363, vol. 1.

D.J. Blumenthal, "Photonic Packet and All-Optical Label Switching Technologies and Techniques", OFC 2002, Mar. 17-22, 2002, pp. 282-284.

T. Sulur et al., "IM/FSK Format for Payload/orthogonal Labelling IP Packets in IP over WDM Networks Supported by GMPLS-based LOBS", ONDM 2003, Feb. 3-5, 2003, Budapest, Hungary, pp. 703-716.

Bjornstad et. al. "A Highly Efficient Optical Packet Switch Node Design Supporting Guaranteed Service", submitted to ECOC 2003, Sep. 21-25, Rimini, Italy, 2 pgs.

J. Hansryd et al., "Impact of PMD on Four-Wave-Mixing Induced Crosstalk in WDM Systems", IEEE Photonics Technology Letters, vol. 12, No. 9, Sep. 2000, pp. 1261-1263.

S. Bjornstad et al., "A Scalable Optical Packet Switch for Variable Length Packets Employing Shared Electronic Buffering", ECOC 2002, vol. 3, 2002, 2 pgs.

S. Bjornstad et al., "QoS Differentiation and Header/payload Separation in Optical Packet Switching Using Polarisation Multiplexing" submitted to ECOC 2003, 2 pgs.

A. Jukan et al., "Quality-of-Service Routing in Optical Networks", ECOC 97, Sep. 1997, pp. 160-163.

S.G. Evangelides Jr., et al., "Polarization Multiplexing with Solitons", Journal of Lightwave Technology, vol. 10, No. 1, Jan. 1992, 8 pages.

P.T. Poggiolino et al., "Performance Evaluation of Subcarrier Encoding of Packet Headers in Quasi-All-Optical Broadband WDM Networks", IEEE Int'l Conference on Communications, 1994 ICC 94, May 1-5, 1994, 6 pages.

* cited by examiner

USE OF POLARIZATION FOR DIFFERENTIATION OF INFORMATION

FIELD OF THE INVENTION

The present invention relates to polarization to distinguish QoS classes, and to distinguish payload and header in packets with communication networks. More generally the present invention relates to a new and improved use of states of polarization within all types of communicational networks.

BACKGROUND OF THE INVENTION

With the introduction and the development of optical networks it is a goal to reduce the cost and complexity of data transmission within voice and data networks. A major factor for achieving this is to reduce the number of signal transformations between optical and electrical signals. Such a reduction will reduce the number of components within the networks elements and reduce the need for electronic signal processing. Further a reduction in the number of components within the networks element will result in a reduction of the sources of errors, and hence reduced need for service and maintenance and an increased operational time. These factors will again result in a potentially reduced cost.

The traffic volume of Internet is reported to show a significant increase despite the downturn of the telecommunication industry. Hence, ingreasing parts of the traffic in the transport network origins from packet data. For obvious economic reasons, new switching techniques should first be introduced at the time they show maturity and cost effectiveness. Hence there is a need to develop flexible optical networks supporting a seamless migration from an optical circuit switched (OCS) to an optical packet switched (OPS) backbone network.

Thus replacing electronical network element with optical network elements it is necessary that the optical network elements have a functionality which can operate effectively within a packet switched network. In the last few years intensive research have been spent on optical packet switching (OPS), and optical burst switching where packets or bursts of packets are switched directly in the optical layer with optical switches. These techniques are expected to be commercially of interest within approximately four years.

The Five Dimensions

As optical signal processing is still immature there are very restricted possibilities for signalling different types of information such as address information. Dimensions available for transfer of information in an optical fibre are: intensity, time, frequency, phase and polarization. All these dimensions are through the years suggested used for different purposes.

The formats of modulation used in optical links and networks are today based on NRZ- and RZ-formats where intensity varies between a minimum- and maximum level. The signals are time divisional multiplexed (TDM) with a data rate between 2.5 and 40 Gb/sec. In optical line switched networks the available and useable optical frequency spectrum is used for multiplexing a number of TDM-channels within one fibre, so called Wavelength Division Multiplexing (WDM). The optical frequency is also suggested used as a label with optical networks where the framework from MPLS is used. Phase and frequency are suggested used as a form of modulation as to increase spectral efficiency likely in combination with polarization.

Optical Package Switching, Address, QoS and Signalling.

In connection with optical package switching transfer of address information in the form of a header or a label is a problem for discussion. Normally, in an electronic router the header will be transferred at the beginning of the package or the frame, and the address information and payload is thereby time multiplexed. Demultiplexing in the time domain is difficult using optical components. Transfer of address information separated from payload is therefore suggested carried out in different manners such as:

1a) Address and payload are separated by the use of separate optical wavelengths; this gives however a bad utilization of the wavelengths.

1b) Usage of a separate frequency within the optical wavelength, so-called Sub Carrier Modulation (SCM), utilizing the optical wavelength more efficiently than when a separate wavelength is used. However, this solution may lead to a deterioration of the payload signal.

1c) In the EU-sponsored project "STOLAS" it is suggested to use frequency modulation for modulation of package header separated from the payload; however this method may also give a deterioration of the signal quality within the payload. STOLAS is an ongoing project within EUs $5^{th}$ general plan "IST". Reference for this theme within the project: Sulur, T. K. et al. "IM/FSK Format for Payload/orthogonal Labelling IP Packets in IP over WDM Networks Supported by GMPLS-based LOBS." ONDM 2003, Feb. 3-5, 2003, Budapest, Hungary.

Several techniques have been proposed for in-band header encoding, like serial header, SubCarrier Modulation (SCM), and Frequency Shift Keying (FSK). However, they require advanced components for separation of header and payload, and reinsertion of new headers. To erase old header, before a new one can be inserted, per input wavelength, serial header requires a fast optical gate e.g. a Semiconductor Optical Amplifier (SOA), while SCM and FSK need an optical wavelength converter. This increases component count of complex and yet technologically immature components. Furthermore, if separation of packets belonging to different QoS classes is desirable, it will normally be done based on electronic processing of the header information, hence not all-optical.

Known Principles

1) Use of polarization of multiplexing/demultiplexing of two data channels (multiplexing by polarization) on one fibre is a known principle.

2) Use of polarization to find a start and stop on a bit-sequence is known, consequently by changing state of polarization.

3) To separate different optical data channels by polarization in the same manner as different optical data channels may be separated on its wavelength. Optical ad/drop entities based on separation between orthogonal polarizations like similar entities which are distinguished by the use of wavelength demonstrated and referred to in the literature.

4) Separation of header- and payload by the use of polarization is patented.

Introduction

In a statistical multiplexed packet switched network, services like constant delay, and no packet loss, can not be guaranteed due to the very nature of statistical multiplexing. This may preclude the use of strict real-time applications, where delay is critical, and packet loss should be at an absolute minimum, like e.g. for remotely controlled surgery. Guaranteed service (GS), without contention causing packet loss, and a fixed delay, can however be offered if the packets are sent through a network following a path with pre-assigned resources, like in a Static or Dynamic Wavelength Routed Optical Network (S-WRON or D-WRON). D-WRONs increases throughput efficiency, compared to S-WRONs, by dynamically reconfiguring the wavelength paths to adapt to the traffic demands. However, the control plane operates on an ms to s timescale, and cannot be optimized to the bursty traffic patterns of OPS, where packet durations are typically in the μs range. Therefore, not even D-WRONs can achieve the throughput efficiency and granularity of statistical multiplexing.

The Package Switch

A package switch may be partial optical and partial electronic or fully optical.

In EP 07944684 A1 it is described an optical package switched network with one or several nodes and a transmitter sending polarized package signals. The package signals comprising a header- and a payload separated from each other by way of orthogonal polarizing. Further it is known from CA 2352113 an optical method of communication where it is utilized a high speed polarized bit stuffing method. The method describes a way of using polarized bit-stuffing for separation of data package instead of multiplexing data streams from different modulators. This increases the speed for transferring of data within an optical network.

Optical packet switching (OPS) is promoted as a way to overcome the electronic bandwidth bottleneck. However, if OPS nodes are to be realised, they must also prove to be cost effective. The present invention proposes to use polarisation multiplexing for a low-cost separation and reinsertion of control information in OPS, as well as for optical differentiation between Quality of Service (QoS) classes. The two applications can be performed simultaneously or separately.

In the present invention it is proposed to combine the properties of a statistically multiplexed packet switched network (OPS) with the GS enabled by optical circuit switched networks (like S-WRON/D-WRON) in a single optical network layer. This requires that the circuit switched GS packets and the OPS packets efficiently share the data layer resources. A node design that allows full sharing of link bandwidth is proposed, and that allows a migration from an S-WRON to the more efficient combined network, by adding OPS capability. The efficiency of the node is studied using a simulator.

The technique proposed here, as presented in the present invention, overcomes the drawbacks as described above by using orthogonal States of Polarisation (SOP) for separating packets and sending control information. By using a Polarisation Beam Splitter (PBS) per wavelength for header/payload separation, the complexity and cost may be reduced significantly, compared to the solutions mentioned above.

BRIEF DISCUSSION OF THE INVENTION

The present invention is trying to avoid the problems mentioned earlier which are linked to today's solutions, since it presents a method and a system for signalling within optical or combined optical/electrical network characterized in that one at a first transmission node executes polarization multiplexing of transmitted traffic, and that at one or more intermediate nodes is executing one or more of the following processing of the transmitted traffic:

demultiplexing of polarization of the received traffic and/or multiplexing by polarization and/or time divisional multiplexing of the received traffic, and/or SOP-alignment of the received traffic.

BRIEF DESCRIPTION OF THE DRAWINGS

The enclosed drawings which are included and which form a part of the specification are illustrating embodiments of the present invention and serves, together with the description, as an explanation for the principals of the invention.

DETAILED DESCRIPTION OF THE INVENTION

In the following it is given a detailed description of the present invention with support in the enclosed figures. As mentioned earlier there are several problems related to OPS. The present invention is redressing these problems by other things by using polarization for signalling.

One can imagine the signalization being used in different ways:

3a) Synchronizing, the state of polarization changes at the beginning of each package.

3b) Header- and payload within each package is separated by orthogonal states of polarization.

3c) QoS-classes are separated by assigning different priority to packages to be processed, thus having different polarization on the transmitter side.

Figure 1:
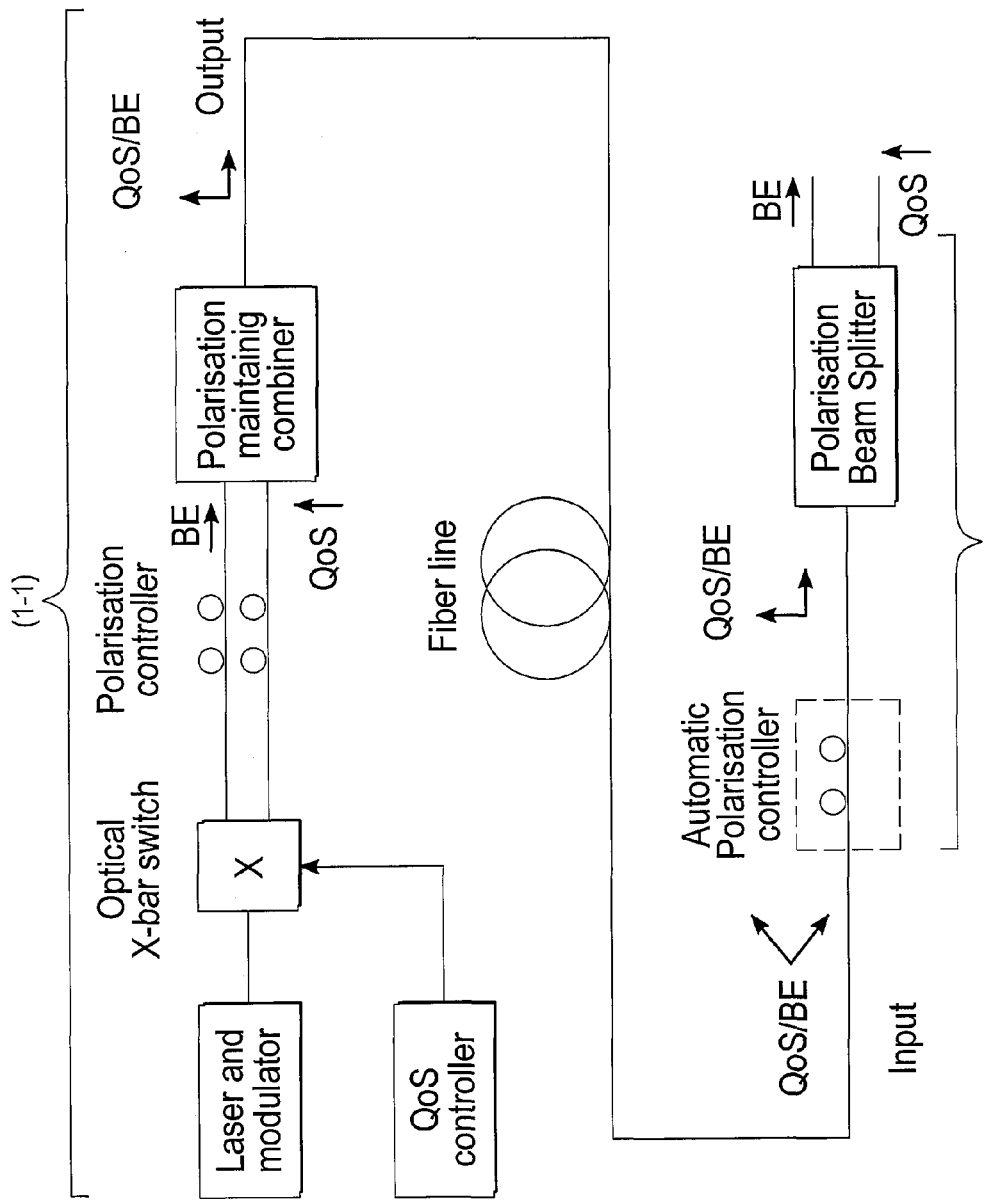
FIG. 1 shows packages which belong to different QoS-classes assigned relative orthogonal states of polarization. Thus it becomes possible for the receiver to separate two classes of priority optically by the use of a simple polarization beam splitter.

In FIG. 1 it is given an example on how the states of polarization may be used for optical separation between two different QoS-classes. The same principle may be utilized to separate optically between a header- and a payload. The method may, with the use of a polarization beam splitter, separate the information dependent of the wavelength. If a WDM-signal with a number of wavelengths is sent towards the splitter, the splitter will function as a demultiplexer for header- and payload or QoS-classes for all the wavelengths.

Figure 2:
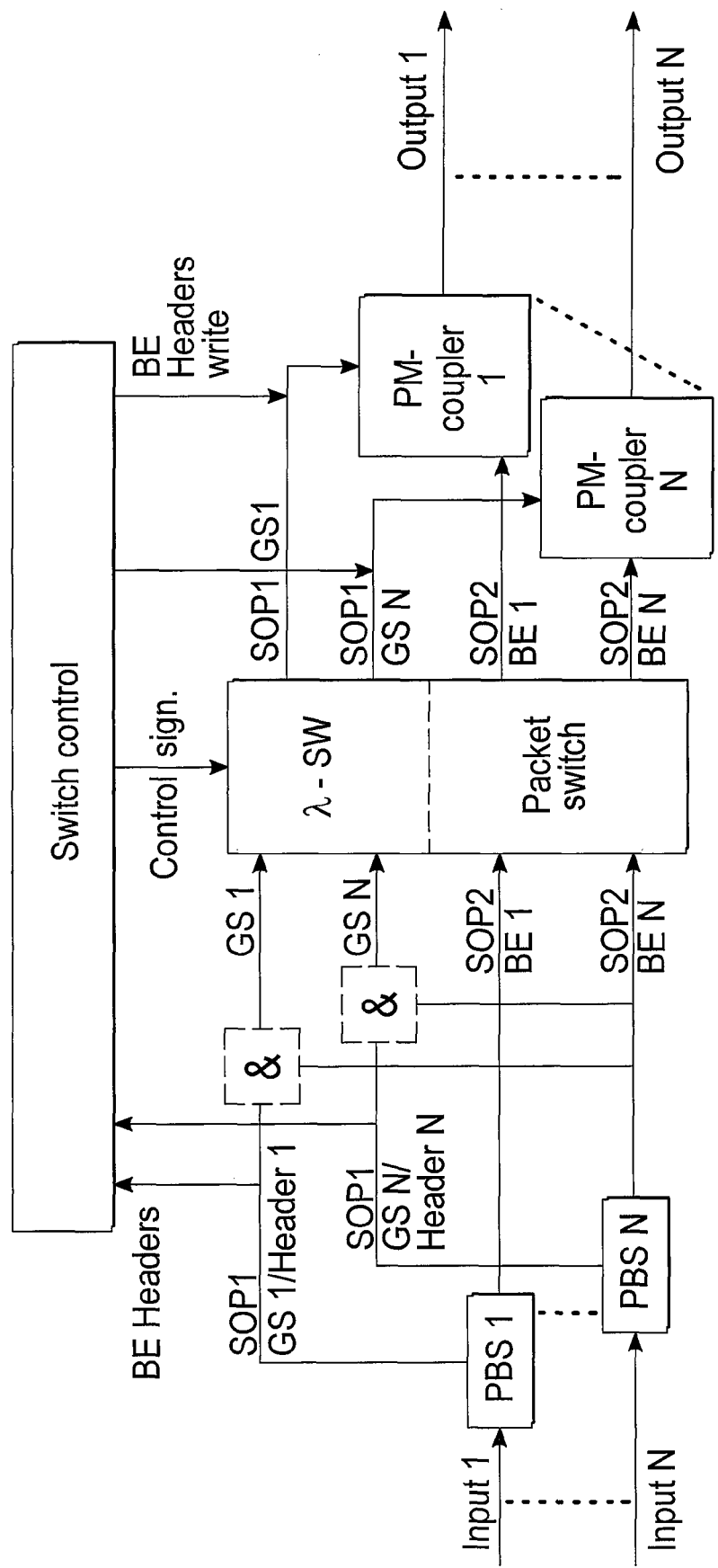
FIG. 2 shows the proposed node design. The resources used in the 1-switch and packet switch are shared. The number of inputs needed equals the number of input fibres X the number of link-wavelengths, GS=Guaranteed Service. &=Optical And Gate.

FIG. 2 illustrates one embodiment of the present invention. Header and payload separation is implemented by sending the header in an SOP labelled '1', and the payload in SOP '2', orthogonal to '1'. Separation is done using a PBS, allowing full transparency with respect to bit rate and signal format for both header and payload.

Additionally, if a very high QoS is needed with a Guaranteed Service (GS) with respect to packet loss and delay, like e.g. remote image guided surgery, the GS packets may be forwarded solely on the basis of their wavelength information using a wavelength router. These packets can be separated from e.g. Best Effort (BE) packets by transmitting BE packets in SOP '2', while GS packets are transmitted in the SOP '1', like in FIG. 2. GS packets will then pass through a wavelength routed network allowing GS, while BE packets will be interleaved with the GS packets at the output of each node, increasing the utilisation of the links. The GS-packages are delayed equally to the longest BE-package in every node so that by detecting a GS-package on the input one can reserve the output and make sure that for the moment no BE-package is transmitted. In this way package contentions between BE- and GS-packages are avoided.

Both described embodiments can be combined. GS packets will then be sent in SOP '1', without an orthogonal polarisation header, while BE packets will be sent in the SOP '2' with a simultaneously transmitted header in SOP '1'. When a signal is observed in SOP '1', with a signal simultaneously present in SOP '2', the signal in SOP '1' is recognised as the header of a BE packet. If there is no signal simultaneously present in SOP '2', the signal is recognised as a GS packet. When using this method, detection of the simultaneous presence of signals in the two SOP's enables distinction of GS packets and BE headers. If serial BE header is used, distinction can be implemented sending the signals from the two SOP's into an optical AND gate. The GS packets in SOP '1' are forwarded through the AND gate if SOP '2' is high, while if SOP '2' is low, a BE header in SOP '1' is present, and blocked by the gate.

If only one application is implemented, BE and GS packets, or a header and a BE packet, can be sent simultaneously in both SOPs. This has the potential of doubling the link's bandwidth utilisation.

AN EXEMPLIFIED EMBODIMENTS OF THE PRESENT INVENTION

The transmission properties of the principle have much in common with polarisation multiplexing: Depending on the fibre's birefringence, PMD and the link distance, signals are depolarised. However, unlike conventional polarisation multiplexing, where a polarisation demultiplexing is done only at the receiver node, the present invention includes polarisation demultiplexing, polarisation, SOP re-alignment and polarisation multiplexing in all intermediate "core nodes". This increases tolerance to depolarisation and changes in SOPs, thereby allowing longer transmission distances.

Figure 3:
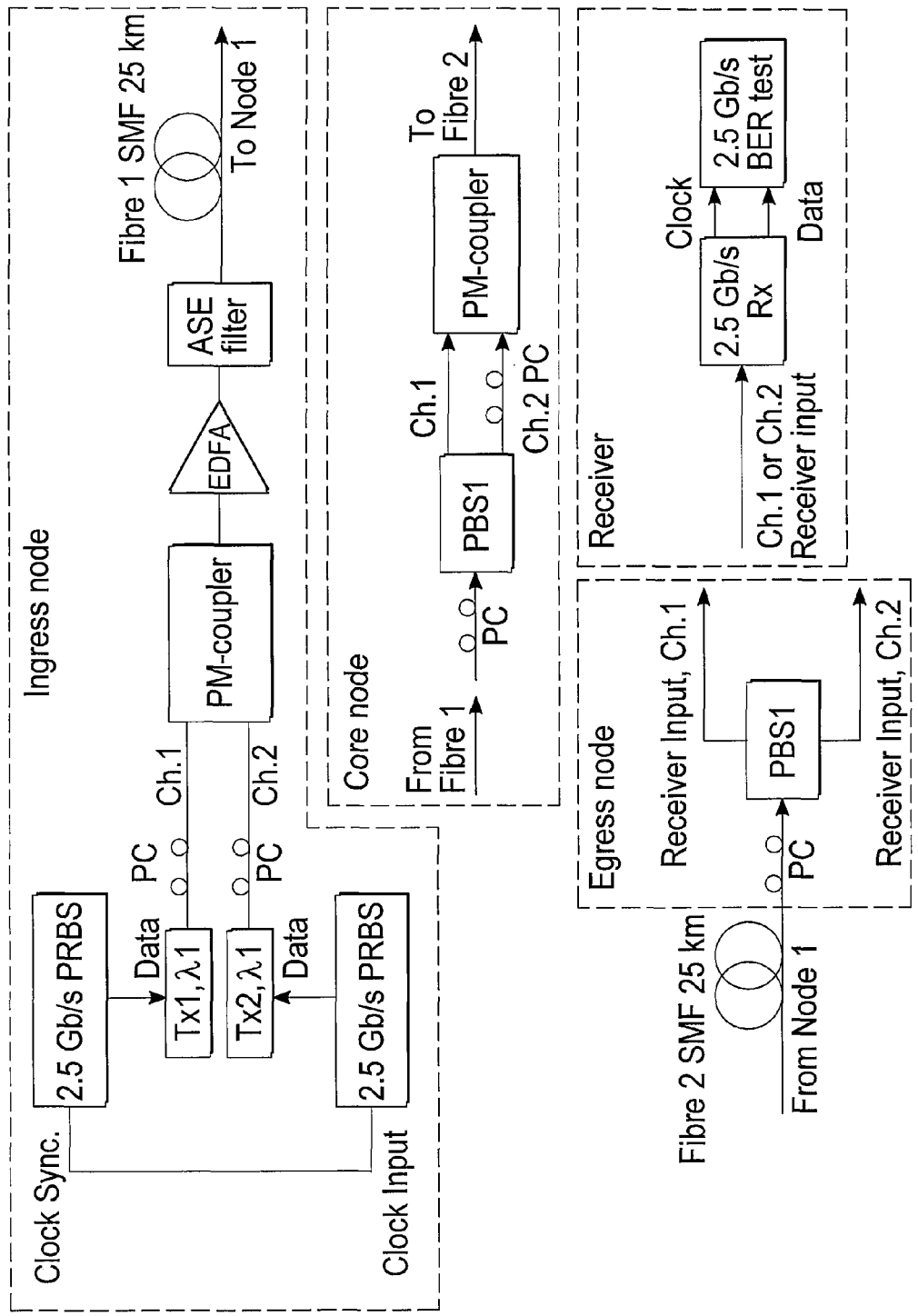
FIG. 3 shows experimental setup. PC=Polarisation Controller, i.e. device for adjustment of state of polarisation.

The quality of the signal path through a network model using one of the described embodiments is shown. The experimental set-up, corresponding to a network consisting of an ingress node, a core node and an egress node, is shown in FIG. 3. Two optical transmitters on the same wavelength are modulated at 2.488 Gb/s using two separate and decorrelated bit generators with PRBS of length $2^{11}-1$. The signals are combined using a polarisation maintaining coupling (PM) coupler, and amplified using an EDFA. After the first 25 km SMF link, the signals arrive at the "Core Node". A manual Polarisation Controller (PC) ensures an ideal SOP to allow optimum splitting of the two signals in a PBS. To emulate forwarding of the signals, the two arms are combined using a PM coupler, and sent to the receiver node, through the second 25 km SMF link. Here, the two signals are again realigned and separated, before sent to the receiver. Power penalties are found comparing transmission path and back-to-back Bit Error Rate (BER) curves in different configurations. Because of the polarisation variations occurring in the fibre due to variations in the fibres environmental conditions, like temperature variations, SOPs at the PBS inputs must be continuously monitored and optimised. The frequency of the variations caused by the environment is normally lower than an Hz; automatic polarisation optimisation can therefore be used.

Figure 4:
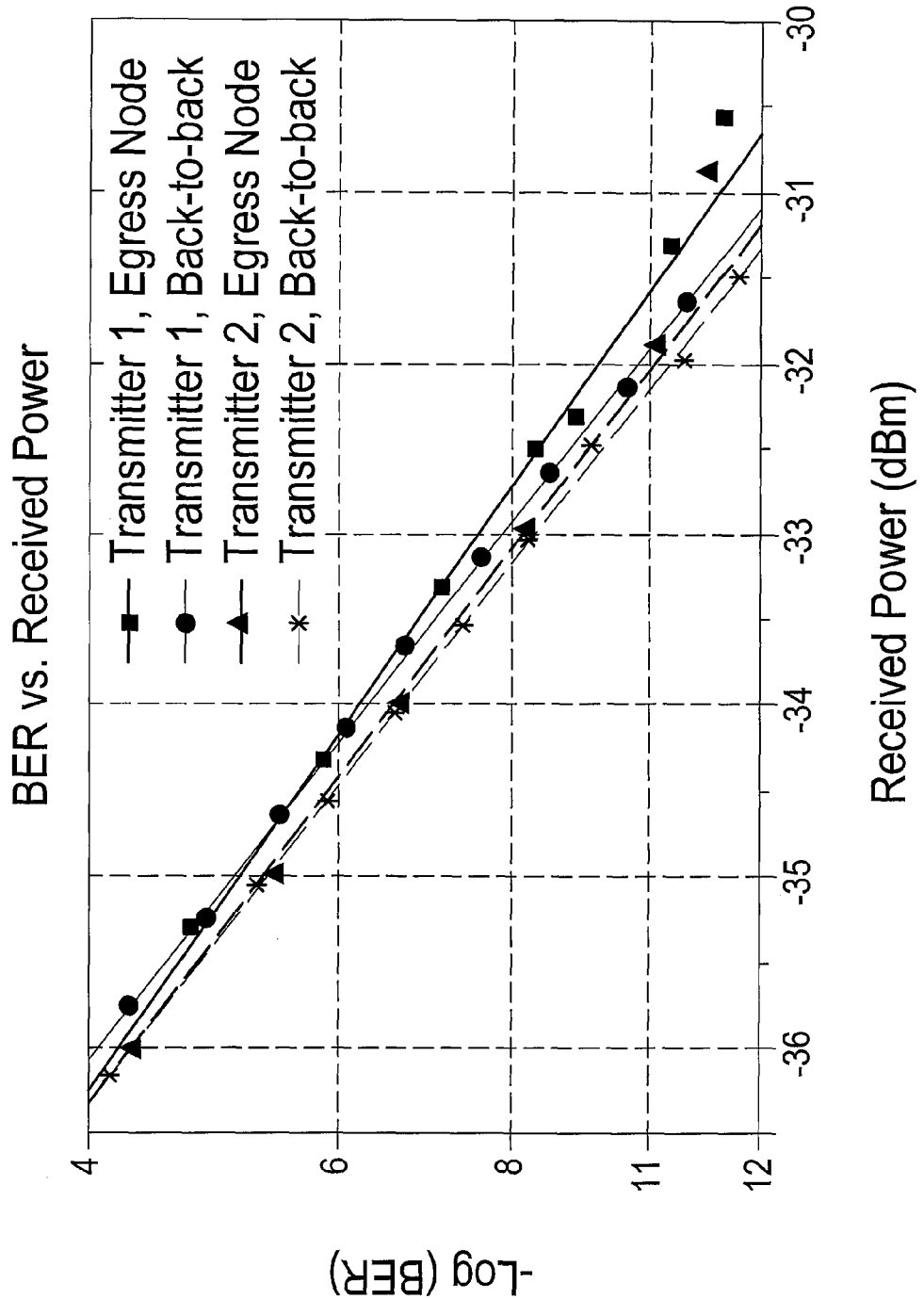
FIG. 4 shows, Sensitivity curves for two signals, both for back-to-back (stippled lines) and at the egress node. The characteristic of the transmission for the header/payload separation is measured using modulation on both transmitters, thus this is the most critical situation, with crosstalk between the two polarisation signals. Modulation of both transmitters at the same time is equal to sending header- and payload simultaneously, or having two packets with different QoS class transmitted at the same time. Using this principle prohibits the use of the node as shown in FIG. 2 due to the fact that this node depends on simultaneous modulation of only one of the polarising states where the other is used as a control signal. Experimentation with modulation of one transmitter at a time has shown less signal deterioration. This equals sending header- and payload serially and having packets belonging to different QoS being sent serially. The node as shown in FIG. 2 is supporting this principle. A polarisation state is the modulated whereas the other serves as a control signal so as to indicate whether a header is transferred to the BE-packet or to a GS packet.

Two different transmission schemes, illustrating two embodiments were tested. The transmission characteristics of the header-payload separation is measured using modulation on both transmitters, while segregation of packets belonging to different QoS classes is done by modulating only one transmitter at a time, leaving the other in CW mode. The most critical application is when both polarisation states are modulated. However, as shown in FIG. 4, segregating packets was demonstrated with a very moderate penalty. The experimental points are interconnected by a linear fit, taking all but the very last measurement of the two egress node series into account. These are omitted because, during the measurement, drift in absolute SOP's, thus sub-optimum header-payload separation, occurred. This can be avoided using automatic PC. As shown in FIG. 4, a maximum penalty of less than 0.5 dB can be observed at a BER of $10^{-9}$.

Thus the use of polarisation multiplexing for header and payload separation and for optical QoS differentiation in optical packet switched networks has been shown. The principle of a packet switch node is described and the quality of the signal path through a network model is experimentally verified. Using this principle, the need for complex costly components is significantly reduced, and optical QoS packet segregation is achieved. A maximum penalty of only 0.5 dB was observed at the receiver node after passing the suggested optical packet switch node and 2×25 km of SMF.

Best Mode of a Node Design

Figure 5:
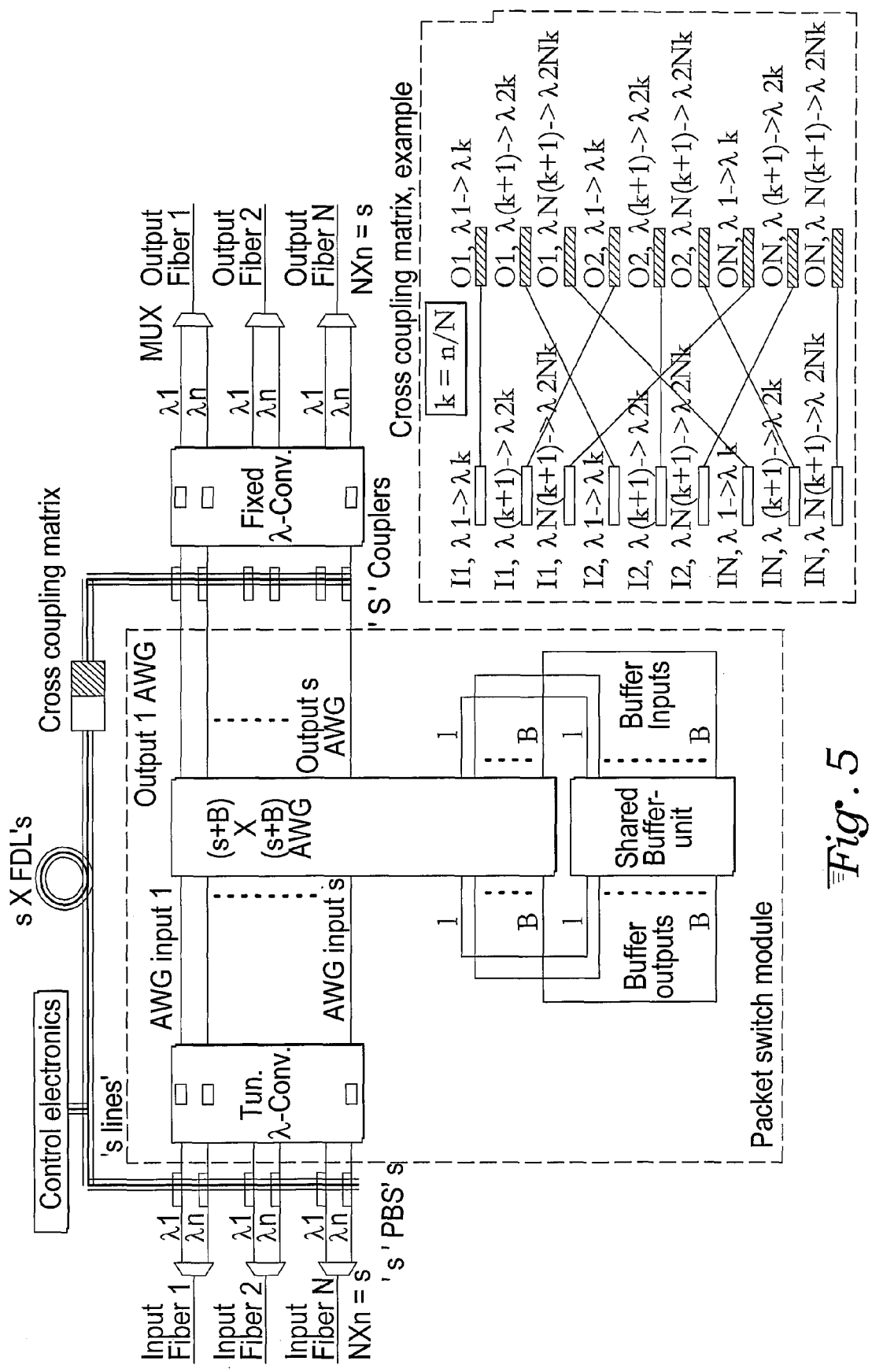
FIG. 5 shows, the OPS part of the node as an embedded part of an S-WRON node with a hardwired cross coupling matrix. In the S-WRON configuration example, each of the nodes connected to the inputs have 'k' wavelength-connections available to each of the outputs. The fixed wavelength converters enable on-line reconfiguration of the S-WRON. FDL=Fibre Delay Line, n=number of link-wavelength. N=Number of link inputs.

The proposed node design according to the present invention is shown in FIG. 5, where an OPS module is added to an S-WRON node. Packets are divided into two classes: "GS", that follows the pre-assigned S-WRON path, and a Best Effort class, "BE", without service guarantees, which is switched using the packet switch module. At the input, the two packet classes are segregated by setting 1×2 switches based on information in a header, or as shown in the FIG. 5 by using orthogonal States of Polarization (SOP). Then each of the polarization states is assigned to each of the service, classes.

Since the GS packets destinations are decided by the configuration of the cross coupling matrix and the individual wavelengths of the packets, as shown in FIG. 5, GS headers are superfluous. Since service class segregation is achieved using SOP, contrary to principles as known from the prior art of optical QoS separation using reservation of wavelengths in an OCS network, the wavelength domain can be entirely devoted to wavelength routing purposes.

If a GS packet arrives at the switch, the control electronics register that a packet is present at the input before the packet is delayed in a FDL corresponding to the duration of a maximum sized BE packet, $D_{BEMAX}$. The output for which the packet is scheduled is then reserved. If a BE packet is currently propagating through the reserved output, it will not collide with the newly arrived GS packet, because of the delay in the FDL. Alternatively, the output can be reserved $D_{BEMAX}$ in advance of the GS packet arrival by sending a control packet. If SOP is used for segregating the packet classes, the control packet should be sent in the same SOP as the GS packet, enabling simultaneous transmission with potentially earlier transmitted BE packets.

Performance Analysis

Packet delay and packet loss is found by simulation. Independent, asynchronous traffic generators, generating fixed length packets are used. The BE packets have a length of 500 B, while the GS packets length is varied, and set to either 500 B or 50 kB. An output is reserved $D_{BEMAX}$ before a GS packet that arrives at the input enters the output.

The packets interarrival times are negative exponential distributed (Poisson), corresponding to a load of 0.8 of a maximum load on each wavelength. Packet arrivals, both BE and GS, are uniformly distributed at the switch inputs. BE packet destinations are uniformly distributed, thereby also among the outputs. The GS packets are forwarded to a fixed destination and wavelength, uniformly distributed, hence avoiding congestion with other GS packets.

Electronic buffering is assumed, therefore the BE packets can stay in the buffer for an arbitrary period of time. There is no limit on the size of the buffer; however the registered maximum filling of the buffer was 632 packets. The use of a very large buffer is therefore avoided. Buffered packets are normally scheduled as soon as a destined output becomes available, but reordering of packets may occur in rare cases.

The node performance is analysed in a transport network for 32 and 128 wavelengths at a node-degree of 8, varying the number of buffer inputs. The maximum delay measured, was 0.21 times the packet duration, in the case of 60 buffer inputs, 50% GS traffic share, 50 kB GS packet length, also giving maximum buffer filling. This is normally much lower than the transmission delay and hence negligible. The simulation results showing PLR, for GS packet share of 10% and 50% of the total traffic load, measured in bytes, are shown in FIGS. 6 and 7, respectively.

Figure 6:
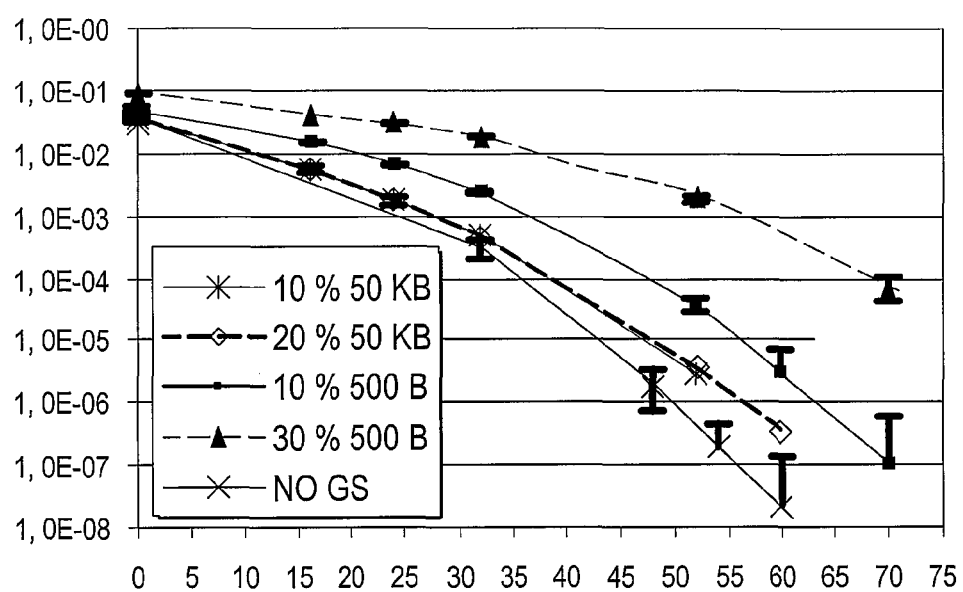
FIG. 6 shows a PLR for a system with exclusive BE-traffic for 32λ as well as with GS-shares of 10% and 30% at 50 kb and 10 and 50% at 500 B packet lengths.
Figure 7:
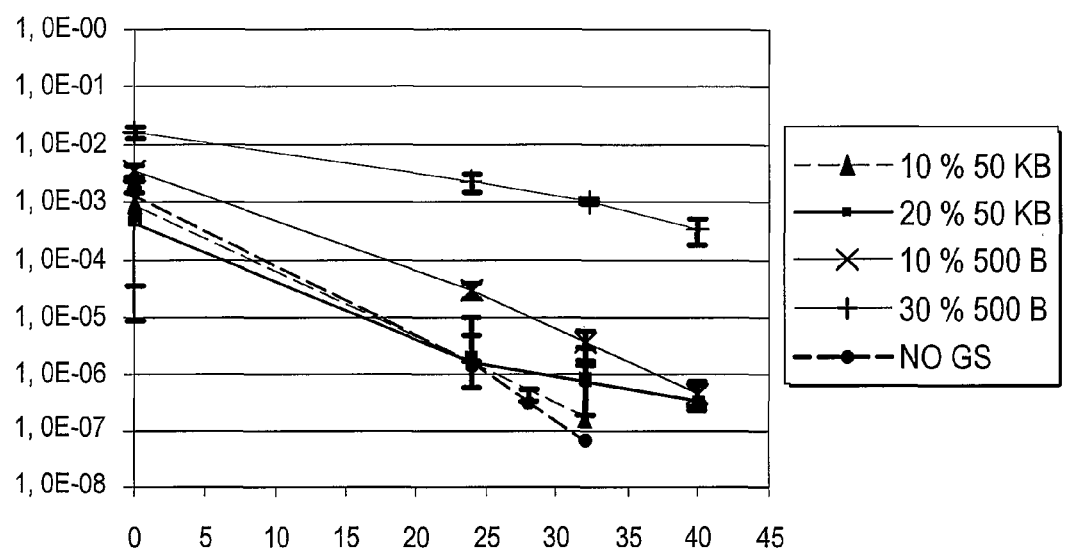
FIG. 7 shows a PLR for a system with exclusive BE-traffic for 128λ as well as with GS-shares of 10% and 30% at 50 kb and 10 and 50% at 500 B packet lengths

In FIGS. 6 and 7 the performance with a system with only BE traffic is compared. When the PLR for the pure BE traffic is $10^{-6}$, for 32 wavelengths and a GS packet length of 500 bytes, the degradation is two decades for a 10% GS traffic share, while for 50% GS traffic share the degradation is more than three decades. If a GS packet length of 50 kB is used, the 50% and 10% curves are overlapping, and the degradation is one decade. FIG. 7, for 128 wavelengths, show the same tendency. At a pure BE system PLR of $10^{-6}$, degradation can be observed for GS packets when the packet length is 500 Bytes. At a GS traffic share of 10%, the degradation is approximately one decade, and for 50% GS traffic, the degradation is approximately three decades. Worth noticing is that when the number of buffer interfaces is further increased, causing lower PLR's, degradation is observed also when using GS packets of 50 kB length. At a pure BE system PLR of $10^{-7}$, the degradation is one half of a decade and one decade for 10% and 50% GS traffic shares, respectively.

FIGS. 6 and 7 illustrates that the overhead caused by the reservation time is the main reason for the PLR degradation. Generally, a degradation increasing with the decreasing PLR and thus, number of interfaces, can be observed. When the GS packet length is large (50 kB), the degradation is low, independently of the GS traffic share. However, when GS and BE packets have equal length, the degradation may be several decades. From the simulation results we conclude that the PLR penalty is low if the GS packets are much longer than $D_{BEMAX}$. Since GS packets are given absolute priority, the very low BE PLR penalty observed, even when 50% of the total traffic is GS packets, may come as a surprise. However, when increasing the number of GS packets in the system, the number of BE packets are decreased, causing less problems with contention between BE packets and less load on the available buffer resources.

Conclusions

An OPS node design according to the present invention supporting GS without packet loss and with fixed delay, as well as a BE service class is proposed. The design supports a migration strategy from circuit to packet switching by starting with an S-WRON module and adding an OPS module. High capacity utilisation is obtained by interleaving statistically multiplexed BE packets with GS packets that follow a pre-assigned wavelength path. The penalty of introducing GS packets in the system is shown to be very moderate if the GS packets is much longer than the BE packets. Aggregation of GS packets into bursts must therefore be considered.

Hybrid Electronic/Optical Switch with QoS

Figure 8:
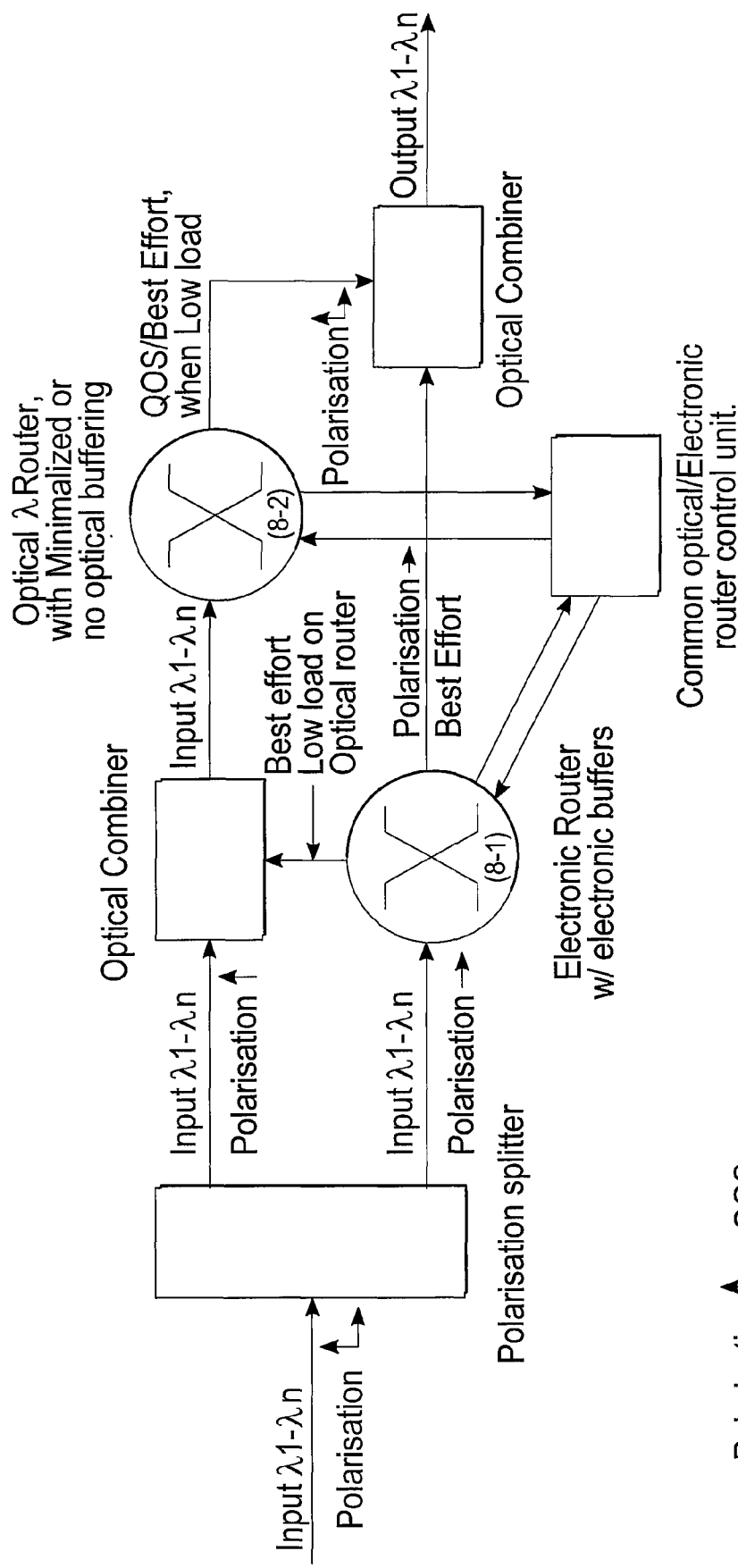
FIG. 8 shows a sketch of a hybrid switch. The router may handle two QoS classes, best effort (BE) and a first priority traffic. The polarization of the light is used for signalling the QoS class. BE is electronically managed, whereas first priority traffic are optically handled. In the optical switch it is the wavelength that determines where to forward a packet.

In the following section a hybrid construction is described where a switch is built with an optical forwarding of a class of quality (GS) and an electronic forwarding of another class of quality (BE). FIG. 8 presents a sketch of the building of the sketch.

The switch has two switching matrixes, one electronic and one optical switch matrix. The electronic switching matrix is to a great extent similar to today's electronic switches switching matrix, as known from the Prior Art, and works together with the control entity in a manner known from Prior Art "Best Effort" switches.

The optical switching matrix is supposed to function as a "wavelength router". An inward wavelength is sent to an appointed fibre and outward wavelength. The outward wavelength and the outward fibre are fixed according to the inward wavelength and the inward fibre. As shown in FIG. 8 in the illustration only one fibre is used. This approach has similarities with MPLS wherein the wavelength can be considered as a label.

At the input the signal is split according to the optical signal's polarization. The advantage of this solution is a pure optical entity which may be used to split the traffic which is supposed to be handled as first priority, and which is supposed to be handled as BE-traffic. The solution presumes that the transmitting party is classifying priority traffic and BE traffic by sending these with orthogonal polarization relatively to each other. The solution may in principle be an addition to the electronic switch wherein the electronic switch is maintained as it is today, and handled "Best effort"-traffic, while the optical wavelength router is handling first priority traffic. The design will then differ from and be less optimal than shown in FIG. 8. There will be no possibilities for the electronic switch to let the optical switch handle the traffic when the latter has available capacity. The utilization of the optical part will therefore become less optimal; however the design becomes considerably simplified.

In FIG. 8 it is thought that a number of wavelengths reserves to the electronic switch and a number to the optical switch. If the optical switch is an addition, this number of wavelengths may be a fixed number, or it may be controlled centrally. If the two switches are built together from the beginning, the number of wavelengths can easier vary and be dynamic and be handled internally in the switch.

Optical Switching of Both GS and BE Packages with a Possibility of Electronic Buffering.

Figure 9:
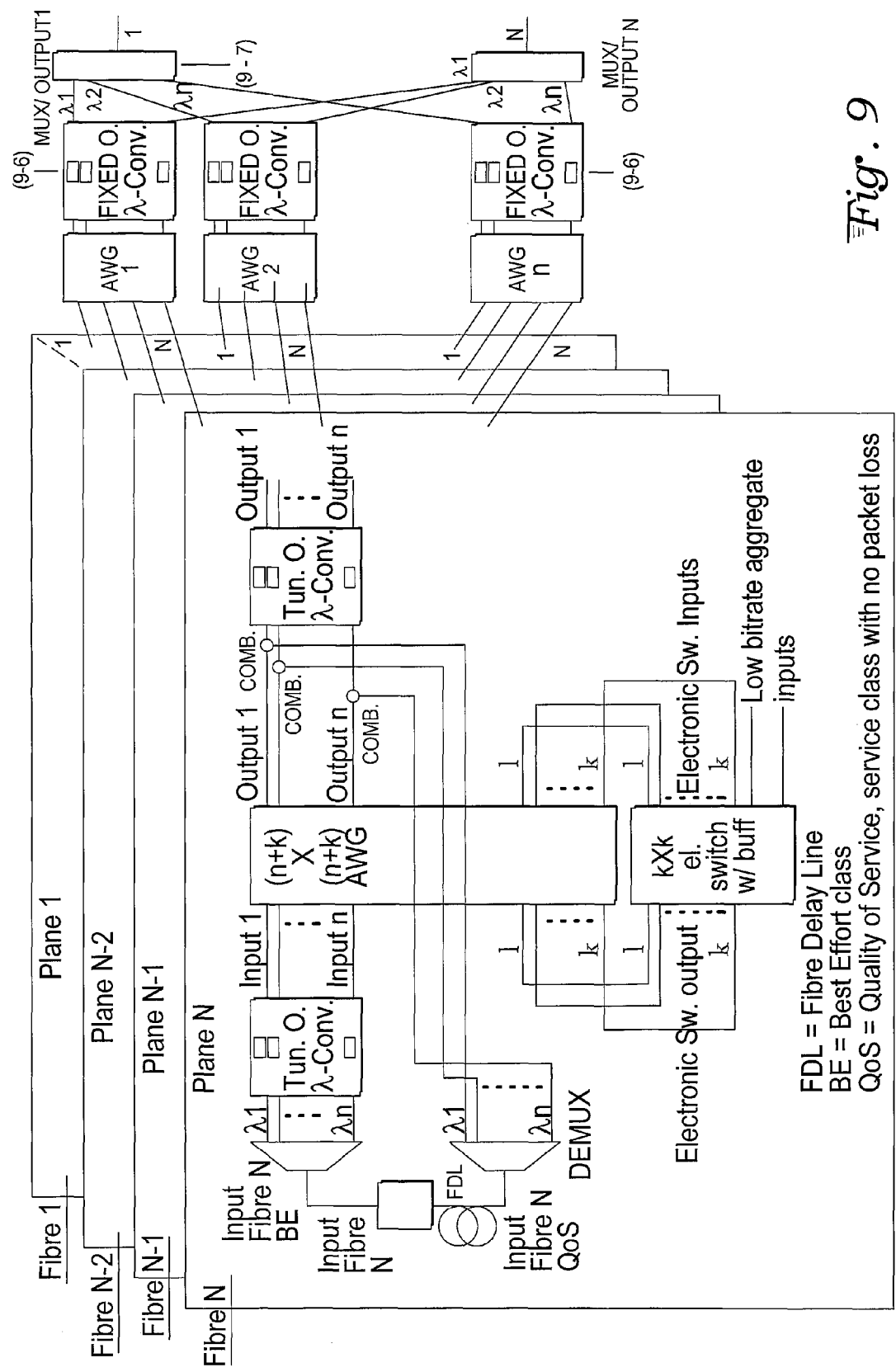
FIG. 9 shows a scalable design with QoS priority. Whether the packet will have priority or not, is decided by the state of polarisation of the packet at the input.

Another design example is given in FIG. 9. By always delaying packets with high priority (QoS packet), outputs can be reserved so that the destined output is vacant when the packet occurs at the output of the optical buffer.

In this design BE packets may choose freely among all the wavelengths at the output of the switch. In the first stage of the switch the output wavelengths is chosen. The QoS packets bypasses this first stage, hence the QoS packets input wavelength will decide the output wavelength at the output fibre. To which output fibre the packet is forwarded, is decided by the wavelength set by the packet switch's second row of wavelength-converters. In the third row of wavelength-converters, the wavelength will be set to a fixed wavelength matching the input wavelength of specific input of a mux. Hence there is not possible changing the wavelength.

Figure 10:
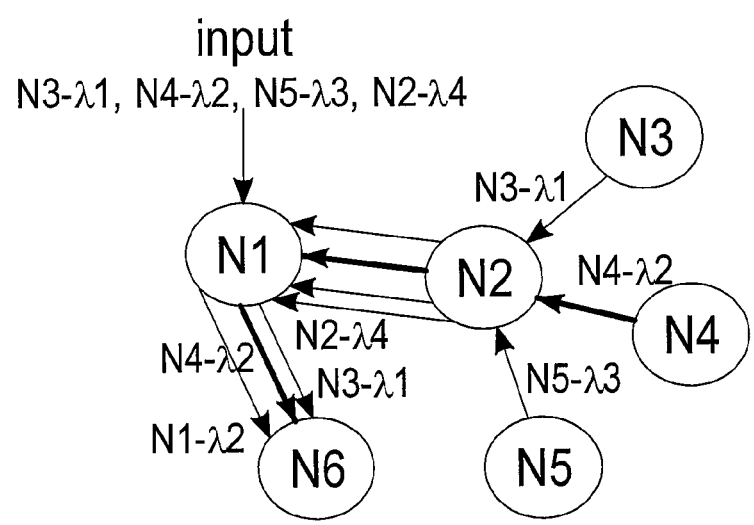
FIG. 10 shows, a network with a number of nodes and QoS connections between some of these.

Because there is not possible to buffer the QoS packets for contention resolution in this design, a reservation scheme will be necessary. Before a QoS packet is transmitted, a wavelength from the transmitter to the destination should be reserved. This implies that each of the receivers will simultaneously be able to receive QoS packets from a number of destinations limited to the number of input wavelengths at the receiver end. To avoid contention, no more than one source will be allowed to generate packets to each of the input wavelengths in a node. FIG. 10 illustrates this principle.

In the network shown in FIG. 10, when QoS information is sent from one node to another, say from node 4, to node 6, a path consisting of one or more wavelengths needs to be reserved all the way through the network, from node 4 to node 6. The reservation implies that no other nodes can transmit QoS information at the reserved wavelength if the wavelengths are sharing the same path (fibre) along the way. If two nodes where transmitting at the same wavelength, contention would occur. Since no buffering is available for QoS packets, packets would have to be dropped. This can be avoided using reservation of a wavelength.

Wavelengths can both be reused, and added/dropped. As shown in the FIG. 10, at node N1, the incoming wavelength from node N2, named N2-λ 4, is dropped at N1, and reused for sending QoS packets from node N1 to node N6 (N1-λ 4).

Scalability

Figure 11:
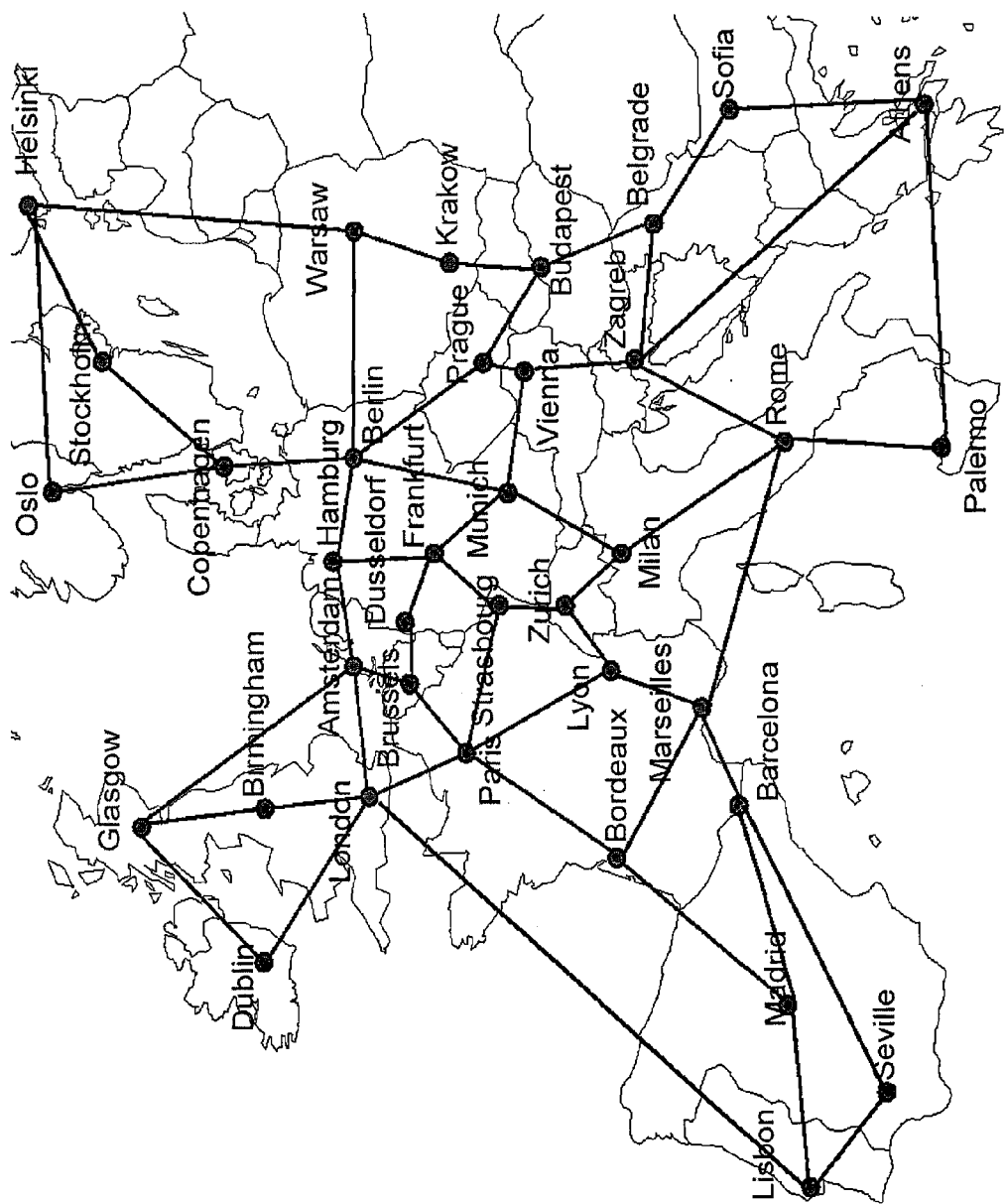
FIG. 11 shows a reference scenario for a pan-European network with 37 nodes, with a maximum node degree of 5.

Normally the node degree in a transport network like this will be in the order of say 4-8. Also the total number of nodes in the transport network will be limited. In COST 266 a reference scenario for a pan European network is given. FIG. 11 illustrates this network. In the network a total of 37 Nodes is present, and it has a maximum node degree of 5. The question is whether a static configuration of QoS resources will be sufficiently effective in a transport network. Whether this is true will depend on the amount of QoS traffic in the network, and the number of wavelengths in each node. The packet switch design described will be effective only when a high number of wavelengths is available. This is because the design relies on using the wavelength dimension for contention resolution. Number of wavelengths should therefore be 32 or more Dynamic Wavelength Allocation for Scalability If a dynamic wavelength allocation scheme is employed, wavelengths can dynamically be set up and taken down on demand. This will increase the utilization of the resources available for transmitting QoS packets, since it will allow dynamic changes in the traffic load. If the node in FIG. 9 is slightly modified, replacing the fixed wavelength converters at the output with tuneable wavelength converters, the wavelength for a QoS path can be allowed to change along the way. This will allow a higher reuse factor of the wavelengths in the network. However, a technical problem when multiplexing the unpredictable wavelengths at the output of the tuneable wavelength converters has to be solved. Normally a low loss multiplexer will be wavelength sensitive. Other approaches to switching the wavelength in the node may be evaluated.

Transparent Dynamic Line Switching and/or Burst Switching

The QoS packets do actually not need to be packets. They can be bursts of packets, i.e. burst switching can be performed, or it can be a semi-permanent line, i.e. line switching. It will all depend on the preferred approach. When a QoS packet arrives at the input of the switch, a change in the state of polarisation will be detected. Hence it is known that it is a QoS packet. At the end of a QoS packet, the state of polarisation has to be changed back to is the "best effort state" so that when the QoS packet has passed the polarisation monitor, the switch will know the end of the packet. The output and the resources in the switch will then be freed, so that resources can be used by the Best Effort packets.

Since the start and stop of the QoS packets is detected only by change in state of polarisation, and QoS packets will never be passed to the buffer, there is no need to know the content of the information in the QoS packets. The physical format of the QoS packet, like bitrate and modulation, can therefore in principle be varied. The limitations on the transparency will be set by the characteristics of the wavelength converters.

For forwarding of the QoS packets, the destination of the packet must be known in advance. This is for the switch to be able to set the wavelength converter in the second row of converters. The information about the QoS packet should be sent in advance. There are two approaches to this:

4a) Burst switching approach: This principle should be used if there are few QoS paths in the network, and they will have to be reused often. QoS paths can be established for a very short period of time, corresponding to the length of a packet, or a burst of packets.

The information about the destination for QoS packets occurring at a specific input and wavelength is sent as a control packet. The control packet can be sent on a separate wavelength, or at the same wavelength, and will contain a header, telling the destination of the QoS packet(s). It does not need to contain information about the length of the packet or burst of packets, since the state of polarisation will tell the start and stop of the packets or burst. In burst switching, information about the arrival time of the packet is sent out in advance. This is for the immediate nodes to be able to reserve bandwidth during a, in the control packet, specified period of time. However since the QoS packets are always buffered in the switch in an optical fibre delay line, bandwidth reservation is not necessary in advance, it will be done when the QoS packet arrives at the switch. In addition, a protocol for distribution of the forwarding information will be needed. A table containing a mapping between the address information in the control packet and how to set the wavelength converters is necessary.

4b) Line switching approach: This principle should be used when QoS paths will have a duration that is much longer than a burst of packets. The output wavelength of the wavelength converter will be set to a wavelength according to a table. The table will be updated by a protocol distributing the forwarding information. This implies that no address lookup will be needed when a QoS packet arrives, avoiding processing. However, there will be a mapping between a specified input (wavelength), and a specified output wavelength, that can be changed only by updating the table. The speed of the dynamic allocation of QoS paths will therefore be limited by the protocol updating of the table.

Utilization of the QoS Paths

The node design in FIG. 9 allows the QoS paths to be utilized by BE packets when QoS packets are not present. The lights state of polarisation is used for differencing between QoS and BE packets. Therefore, most of the capacity not used by the QoS traffic can be used by the BE packets by interleaving these packets in between the QoS packets or bursts. Technically, it is possible to transmit both QoS and BE packets simultaneously when the polarization is orthogonal. This implies doubling the capacity in the fibre; however this also implies a number of technical challenges with respect to the transmission quality of the signal, since interference between the signals in the two states of polarisation will occur.

When the node design in FIG. 9 is used, BE packets can be buffered and allocated a random wavelength along the path to its destination. This allows the capacity of the wavelengths, and also the wavelengths or paths reserved for transmission of QoS packets, to be efficiently utilized. When no QoS packet is present at a reserved QoS path, a BE packet can, if it is available at one of the inputs or in the buffer, be switched to the reserved QoS path.

When a QoS packet occurs at the input of the switch (node), the packet will be sent in to an optical buffer with a delay corresponding to the length of the longest BE packet. While the QoS packet is in the buffer, the reserved QoS path at the output of the switch will be left vacant from the time when the last packet at this output has left the output until the QoS packet reaches the output of the buffer. The optical buffer will give a predictable delay, thus causing no jitter, with a magnitude insignificant compared to the transmission delay in the fibre between the nodes.

| | Abrreviation list |
|---|---|
| AWG | Arrayed Waveguide Gratings, a component using interferometer principles for wavelength routing or MUX/DEMUX. |
| BE: | Best effort |
| BER | Bit Error Rate |
| Cw | Continuous Wave, laser emitting light, not modulated. |
| D-WRON | Dynamic Wavelength Routed Optical Network |
| EDFA | Erbium-Doped Fibre Amplifier A form of fibre optical amplification in which the transmitted light signal passes through a section erbium-doped fibre and is amplified by means of a laser pump diode. EDFA is used in transmitter booster amplifiers, in-line repeating amplifiers, and receiver preamplifiers. |
| FDL | Fibre Delay Line. |
| FSK | Frequency shift keying. A modulation technique for data transmission. It shifts the frequency above the carrier for a 1 and below the carrier for a 0 (zero) |
| GMPLS | Generalized Multiprotocol Label Switching |
| GS | Guaranteed service. |

-continued

| | Abrreviation list |
|---|---|
| IST | EUs 5th program for support of a number of projects. |
| MPLS | Multiprotocol label switching, this is a "multi-protocol forwarding standard" describing a method for integration of IP and ATM through label swapping. A IP- and ATM switch, i.e. a MPLS switch, comprises ATM hardware with MPLS software. The software is IP addressing, IP-routing and label distribution protocol. |
| NRZ | Non Return to Zero. |
| OCS | Optical circuit switched (networks). |
| OPS | Optical packet switched (networks). |
| OTDM | Optical time division multiplexing. |
| PBS | Polarisation Beam Splitter. |
| PC | Polarisation Controller |
| PLR | Packet Loss Ratio |
| PM | Polarizing Maintaining. |
| PMD | Polarization Mode Dispersion. A dispersion effect created by irregularities in the shape of the fibre optic cable and it score. Resulting in light propagation at different speeds in the two different modes of polarisation |
| PRBS | Pseudo Random Bit Sequence/pattern. A test pattern having the properties of random data (generally 511 or 2047 bits), but generated in such manner that another circuit operating independently, can synchronize on the pattern and detect individual transmission bit errors. |
| QoS | Quality of service. |
| RZ | Return to Zero. |
| SCM | Sub Carrier Modulation combines a signal with a single low frequency sine wave. The low frequency signal is called a subcarrier. This combined signal is then added to a higher frequency radio signal. The resulting high frequency radio signal is very complex and the original signal is not detectable by ordinary means. To detect a signal that has been modulated by a subcarrier, it must be passed through two detector circuits, one to separate the subcarrier from the high frequency radio transmission, and a second to separate the subcarrier from the desired information. |
| SMF | Single mode Fibre. |
| SOA | Semiconductor Optical Amplifier. |
| SOP | States Of Polarisation. |
| S-WRON | Static Wavelength Routed Optical Network. |
| WDM | Optical Wavelength Division Multiplexing |

REFERENCES

1. Mike J. O'Mahony et. al. "The application of Optical Packet Switching in Future Communication Networks", IEEE communication Magazine, March 2001, pages 128-135.
2. Chunming Qiao et. al. "Labelled Optical Burst Switching for IP-over-WDM Integration" IEEE Communication Magazine, September 2000. Pages 104-114.
3. N. Ghani et al. "On IP over WDM integration", IEEE communication magazine, March 2000, pp. 72-83.
4. Betti, S.; Curti, F.; De Marchis, G.; Iannone, E Fondazione Ugo Bordoni, Rome, Italy, "A novel multilevel coherent optical system: 4-quadrature signalling" Journal of Lightwave Technology, page(s): 514-523 April 1991, Volume: 9 Issue: 4
5. Blumenthal, D. J.; Carena, A.; Rau, L.; Curri, V.; Humphries, S. Dept. of Electr. & Comput. Eng., California Univ., Santa Barbara, Calif., USA, "WDM optical IP tag switching with packet-rate wavelength conversion and subcarrier multiplexed addressing", Optical Fiber Communication Conference, 1999, and the International Conference on Integrated Optics and Optical Fiber Communication. OFC/IOOC '99. Technical Digest, page(s): 162-164 vol. 3. 21-26 Feb. 1999

6. Xu Lei; Yao Minyu; Cheng Minghua; Zhang Jianfeng; Cheng Xingzhong; Gao Yizhi; Chih-Hsiao Chen, "All optical frame clock extraction with polarization flag in OTDM system", Communications, 1999. APCC/OECC '99. Fifth Asia-Pacific Conference on . . . and Fourth Optoelectronics and Communications Conference, 1999 Page(s): 361-363 vol. 1
7. Guillemot, et. al. "Transparent optical packet switching: the European ACTS KEOPS project, approach." Journ. Lightwave Techn. 16, pp 2117-2134, 1998.
8. Blumenthal, D. J "Photonic packet and all-optical label switching technologies and techniques"
9. OFC 2002, 17-22 Mar. 2002, pages: 282-2843
10. Sulur, T. K. et. al. "IM/FSK Format for Payload/orthogonal Labelling IP Packets in IP over WDM Networks Supported by GMPLS-based LOBS." ONDM 2003, Feb. 3-5, 2003, Budapest, Hungary.
11. Bjornstad et. al. "A highly efficient optical packet switch node design supporting guaranteed service", submitted to ECOC 2003, Sep. 21-25 Rimini, Italy.
12. J. Hansryd et. al. "Impact of PMD on Four-Wave-Mixing-Induced Crosstalk in WDM Systems." IEEE photonics Technology letters, vol. 12, No. 9. September 2000, page 1261-1263.
13. M. J. O'Mahony et. al. "The application of optical packet switching in future communication networks", IEEE Comm. Mag., vol. 3, no. 3, pp. 128-135, 2001.
14. S. Bjornstad et. al. "A scalable optical packet switch for variable length packets employing shared electronic buffering". ECOC 2002, vol. 3, 2002. P 4.7
15. S. Bjornstad et. al. "QoS differentiation and header/payload separation in optical packet switching using polarisation multiplexing" submitted to ECOC 2003, 2003.
16. A. Jukan et. al. "Quality-of-Service Routing in Optical N works" ECOC 97, 1997, pp. 160-163.

The invention claimed is:

1. A communication network arrangement for handling packets within optical or combined optical/electrical packet switched networks, the communication network arrangement comprising:
   means for dividing packets within the network by first and second QoS classes;
   means for transmitting packets of the first QoS class in a first state of polarization and transmitting packets of the second QoS in a second state of polarization;
   an ingress node; and
   at least one core node, said core node having:
      at least one polarisation beam splitter (PBS1),
      two optical demultiplexers,
      at least one first wavelength converter,
      a second wavelength router, and
      at least one third fixed wavelength converter adapted to forward packets of the first and second QoS class to a first optical multiplexer.

2. A communication network arrangement for handling packets within optical or combined optical/electrical packet switched networks comprising:
   means for dividing packets within the network by first and second QoS classes;
   means for transmitting packets of the first QoS class in a first state of polarization and transmitting packets of the second QoS in a second state of polarization;
   an ingress node, wherein said ingress node:
      has means for separating header and payload for BE-packets by state of polarisation, and
      has means for separating packets by changing state of polarisation at the beginning of every new packet, using at least one polarisation beam splitter (PBS) adapted to receive a WDM-signal with a plurality of wavelengths and wherein the polarisation beam splitter (PBS) is adapted to separate header and payload by using the polarisation beam splitter per wavelength; and
   at least one core node, said core node having at least one polarisation beam splitter (PBS1) and at least one optical demultiplexer.

3. A communication network arrangement for handling packets within optical or combined optical/electrical packet switched networks, the communication network arrangement comprising:
   means for dividing packets within the network by first and second QoS classes;
   means for transmitting packets of the first QoS class in a first state of polarization and transmitting packets of the second QoS in a second state of polarization;
   an ingress node; and
   at least one core node, said core node having at least one polarisation beam splitter (PBS1) and at least one optical demultiplexer, wherein the ingress node and the at least one core node comprises an optical packet switched module attached to a S-WRON node.

4. A method for handling packets within optical or combined optical/electrical packet switched networks comprising at least an ingress node for multiplexing of optical packets by polarization, and an egress node for demultiplexing of received optical packets by polarization comprising:
   dividing packets of the ingress node as first and second QoS classes of packets, and
   transmitting packets of the first QoS class in a first state of polarization and transmitting packets of the second QoS in a second state of polarization, by either interleaving packets of the second QoS class of packets with packets of the first QoS class or by simultaneously transmitting packets of a first QoS class in a first state of polarization and transmitting packets of a second QoS class in a second state of polarization, the states of polarization being substantially orthogonal, wherein the network further has at least one core node that executes at least one of the following steps:
   a) demultiplexing received traffic by polarisation,
   b) polarizing the received traffic, and
   c) SOP-aligning received traffic.

5. The method of claim 4, wherein at least one core node in the optical packet switched network is SOP-realigning received packets.

6. The method of claim 4, wherein when a first packet of a first QoS class arrives at a switch the following steps are carried out:
   a controlling device registering that the first packet is present at the input,
   then delaying the first packet in a FDL in a first pre-determined period of time, and
   reserving an output where the first packet is directed to be transmitted, and
   communicating the first packet exiting a FDL to a reserved vacant output.

7. The method of claim 6, further comprising defining the first predefined period of time to be longer than a second period of time, and defining the second period of time using a packet with a lower QoS level than the first packet where the second packet is of a maximum allowed size.

8. A method for handling packets within optical or combined optical/electrical packet switched networks comprising at least an ingress node for multiplexing of optical packets by polarization, an egress node for demultiplexing of received optical packets by polarization, and at least one core node, comprising:

dividing packets of the ingress node as first and second QoS classes of packets, and transmitting packets of the first QoS class in a first state of polarization and transmitting packets of the second QoS in a second state of polarization, by either interleaving packets of the second QoS class of packets with packets of the first QoS class or by simultaneously transmitting packets of a first QoS class in a first state of polarization and transmitting packets of a second QoS class in a second state of polarization, the states of polarization being substantially orthogonal; and interchanging said first and said second states of polarization at the beginning of each packet, wherein the at least one core node executes time divisional multiplexing of received packets.

9. A method for handling packets within optical or combined optical/electrical packet switched networks comprising at least an ingress node for multiplexing of optical packets by polarization and an egress node for demultiplexing of received optical packets by polarization, comprising:

dividing packets of the ingress node as first and second QoS classes of packets, and transmitting packets of the first QoS class in a first state of polarization and transmitting packets of the second QoS in a second state of polarization, wherein the second and first state of polarization are substantially orthogonal states, by either interleaving packets of the second QoS class of packets with packets of the first QoS class or by simultaneously transmitting packets of a first QoS class in a first state of polarization and transmitting packets of a second QoS class in a second state of polarization, the states of polarization being substantially orthogonal, wherein statistically multiplexed packets of the second QoS class are interleaved with packets of the first QoS class, and wherein the packets of the first QoS class use a predefined wavelength path within a communication network.

10. A method for handling packets within optical or combined optical/electrical packet switched networks comprising at least an ingress node for multiplexing of optical packets by polarization and an egress node for demultiplexing of received optical packets by polarization, comprising:

dividing packets of the ingress node as first and second QoS classes of packets;

transmitting packets of the first QoS class in a first state of polarization and transmitting packets of the second QoS in a second state of polarization, by either interleaving packets of the second QoS class of packets with packets of the first QoS class or by simultaneously transmitting packets of a first QoS class in a first state of polarization and transmitting packets of a second QoS class in a second state of polarization, the states of polarization being substantially orthogronal;

assigning the first QoS class to GS-packets and assigning the second QoS class to BE-packets; and forwarding GS-packets optically using an optical switch and forwarding BE-packets electronically using an electronic switch.

11. A communication network arrangement for handling packets within optical or combined optical/electrical packet switched networks comprising:

means for dividing packets within the network by first and second QoS classes;

means for transmitting packets of the first QoS class in a first state of polarization and transmitting packets of the second QoS in a second state of polarization;

an ingress node, wherein said ingress node:

has means for separating header and payload for BE-packets by state of polarisation, and has means for separating packets by changing state of polarisation at the beginning of every new packet, using at least one polarisation beam splitter and at least one optical demultiplexer adapted to receive a WDM-signal with a plurality of wavelengths, wherein the ingress node is adapted to separate header and payload by using the polarisation beam splitter per wavelength; and at least one core node, said core node having at least one polarisation beam splitter and at least one optical demultiplexer.

* * * * *